(12) United States Patent
Beppu et al.

(10) Patent No.: US 8,303,815 B2
(45) Date of Patent: Nov. 6, 2012

(54) SPIRAL SEPARATION MEMBRANE ELEMENT

(75) Inventors: Masashi Beppu, Osaka (JP); Shinichi Chikura, Osaka (JP)

(73) Assignee: Nitto Denko Corporation, Osaka (JP)

( * ) Notice: Subject to any disclaimer, the term of this patent is extended or adjusted under 35 U.S.C. 154(b) by 416 days.

(21) Appl. No.: 11/722,659

(22) PCT Filed: Oct. 26, 2006

(86) PCT No.: PCT/JP2006/321371
§ 371 (c)(1),
(2), (4) Date: Jun. 22, 2007

(87) PCT Pub. No.: WO2007/052529
PCT Pub. Date: May 10, 2007

(65) Prior Publication Data
US 2008/0190836 A1     Aug. 14, 2008

(30) Foreign Application Priority Data
Oct. 31, 2005 (JP) ................................ 2005-316688

(51) Int. Cl.
B01D 63/10 (2006.01)
B01D 39/08 (2006.01)
(52) U.S. Cl. ............... 210/321.74; 210/505; 210/321.83
(58) Field of Classification Search ................ 422/1–58; 210/321.74, 321.72, 321.78, 321.87; 264/239, 264/299, 241, 319
See application file for complete search history.

(56) References Cited

U.S. PATENT DOCUMENTS
3,386,876 A * 6/1968 Wyckoff ...................... 428/134
(Continued)

FOREIGN PATENT DOCUMENTS
EP       0 478 111       4/1992
(Continued)

OTHER PUBLICATIONS
Song et al. Numerical studies of the impact of spacer geometry on concentration polarization in spiral wound membrane modules. Ind. Eng. Chem. Res. vol. 44, 2005: 7638-7645.*

(Continued)

*Primary Examiner* — Vickie Kim
*Assistant Examiner* — Katherine Zalasky
(74) *Attorney, Agent, or Firm* — Knobbe Martens Olson & Bear LLP

(57) ABSTRACT

A spiral-type separation membrane element is provided that can reduce the pressure loss without changing the outer diameter and the inner diameter of the water-collecting tube. In a spiral-type separation membrane element in which a separation membrane, a feed-side flow passageway member, and a permeate-side flow passageway member are wound in a spiral form around a porous water-collecting tube in a laminated state, the feed-side flow passageway member includes a net-constituting thread in a direction tilted relative to a feed solution flow direction; the net-constituting thread has a cross-sectional part such that a thread diameter X in a direction parallel to a feed solution flow plane is larger than a thread diameter Y in a direction perpendicular to the feed solution flow plane; and a central part between intersection parts of the net-constituting thread is made to have a thread diameter Y smaller than that of an intersection part.

8 Claims, 7 Drawing Sheets

U.S. PATENT DOCUMENTS

| | | | |
|---|---|---|---|
| 4,022,692 | A | 5/1977 | Janneck |
| 4,213,858 | A | 7/1980 | Boberg et al. |
| 4,902,417 | A | 2/1990 | Lien |
| 5,073,263 | A | 12/1991 | Fagundes et al. |
| 5,114,582 | A | 5/1992 | Sandstrom et al. |
| 6,106,715 | A | 8/2000 | Thalmann et al. |
| 6,565,747 | B1 | 5/2003 | Shintani et al. |
| 6,881,336 | B2 * | 4/2005 | Johnson .............. 210/321.76 |
| 7,326,659 | B2 * | 2/2008 | Cederblad et al. ............. 442/1 |
| 7,326,660 | B2 * | 2/2008 | Walraevens et al. ............ 442/2 |
| 2003/0205520 | A1 | 11/2003 | Johnson |
| 2004/0182774 | A1 | 9/2004 | Hirokawa et al. |
| 2005/0077229 | A1 | 4/2005 | Ishii |
| 2007/0062857 | A1 | 3/2007 | Popa et al. |
| 2007/0175812 | A1 | 8/2007 | Chikura et al. |
| 2007/0196185 | A1 * | 8/2007 | Kohel et al. ............... 405/302.6 |
| 2007/0199654 | A1 * | 8/2007 | Kohel et al. ............... 156/308.2 |
| 2009/0026130 | A1 | 1/2009 | Chikura et al. |
| 2009/0065426 | A1 | 3/2009 | Ishii et al. |

FOREIGN PATENT DOCUMENTS

| | | |
|---|---|---|
| EP | 0 508 646 | 10/1992 |
| GB | 2164871 A * | 4/1986 |
| JP | 53-124179 | 10/1978 |
| JP | 62-27701 | 2/1987 |
| JP | 4-018921 | 1/1992 |
| JP | 4-326926 | 11/1992 |
| JP | 05-123545 | 5/1993 |
| JP | 5-168869 | 7/1993 |
| JP | 06-007649 | 1/1994 |
| JP | 10-137558 | 5/1998 |
| JP | 10-309445 | 11/1998 |
| JP | 11-235520 | 8/1999 |
| JP | 2000-437 | 1/2000 |
| JP | 2000-042378 | 2/2000 |
| JP | 2000-153270 | 6/2000 |
| JP | 2000-354742 | 12/2000 |
| JP | 2001-017840 | 1/2001 |
| JP | 2001-300271 | 10/2001 |
| JP | 2004-050005 | 2/2004 |
| JP | 2004-283708 | 10/2004 |
| JP | 2005-103516 | 4/2005 |
| JP | 2005-178010 | 7/2005 |
| JP | 2005-279377 | 10/2005 |
| JP | 2006-507919 | 3/2006 |
| JP | 2007-531616 | 11/2007 |
| WO | WO 03/092872 A1 | 11/2003 |
| WO | WO 2004/009222 A1 | 1/2004 |
| WO | WO 2005/097305 A1 | 10/2005 |

OTHER PUBLICATIONS

Da Costa et al. Net-type spacers: Effect of configuration on fluid flow path and ultrafiltration flux. Ind. Eng. Chem. Res. vol. 33, 1994: 1845-1851.*

International Search Report issued on the corresponding PCT Application No. PCT/JP2006/321371, dated Dec. 26, 2006.
International Preliminary Report on Patentability issued on the related PCT Application No. PCT/JP2005/004919, dated Apr. 26, 2005.
International Preliminary Report on Patentability issued on the corresponding PCT Application No. PCT/JP2006/321371, dated May 6, 2008.
International Search Report issued on the related PCT Application No. PCT/JP2005/004919, dated Apr. 26, 2005.
File History of the related U.S. Appl. No. 10/593,760, as of Jun. 23, 2008.
File History of the related U.S. Appl. No. 12/137,317, as of Jun. 23, 2008.
International Search Report issued on the related PCT Application No. PCT/JP2007/054466, dated Jun. 12, 2007.
International Search Report issued on the related PCT Application No. PCT/JP2007/054637, dated Jun. 12, 2007.
Microfilm of the specification and drawings annexed to the request of Japanese Utility Model Application No. 025197/1981 (Laid-open No. 140803/1982).
File History of the related U.S. Appl. No. 10/593,760, for the period of Jun. 24, 2008-Feb. 10, 2009.
File History of the related U.S. Appl. No. 12/137,317, for the period of Jun. 24, 2008-Feb. 10, 2009.
File History of the related U.S. Appl. No. 12/282,138, as of Feb. 10, 2009.
File History of the related U.S. Appl. No. 12/282,550, as of Feb. 10, 2009.
File History of the related U.S. Appl. No. 10/593,760, for the period of Feb. 11, 2009-May 5, 2009.
File History of the related U.S. Appl. No. 12/282,550, for the period of Feb. 11, 2009-May 5, 2009.
Japanese Office Action issued on the corresponding Japanese Patent Application No. 2005-316688, dated Jan. 27, 2010.
File History of the related U.S. Appl. No. 10/593,760, for the period of Feb. 18, 2010-Mar. 24, 2010.
Office Action issued by the European Patent Office on Jul. 4, 2011 for the corresponding European Patent Application No. 06822347.8.
File History of the related U.S. Appl. No. 10/593,760, for the period of May 6, 2009-Feb. 17, 2010.
File History of the related U.S. Appl. No. 12/137,317, for the period of Feb. 11, 2009-Feb. 17, 2010.
File History of the related U.S. Appl. No. 12/282,138, for the period of Feb. 11, 2009-Feb. 17, 2010.
File History of the related U.S. Appl. No. 12/282,550, for the period of May 6, 2009-Feb. 17, 2010.
File History of the related U.S. Appl. No. 12/642,400, as of Feb. 17, 2010.
File History of the related U.S. Appl. No. 12/642,653, as of Feb. 17, 2010.

* cited by examiner

[FIG.1]
(a)
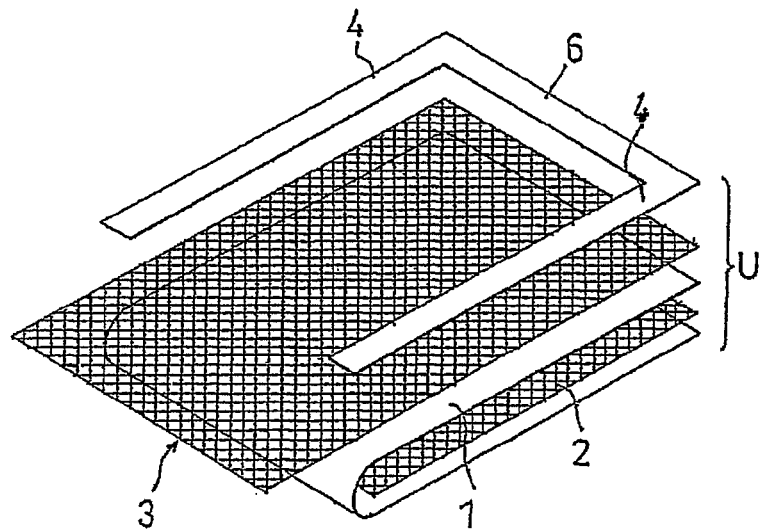
(b)
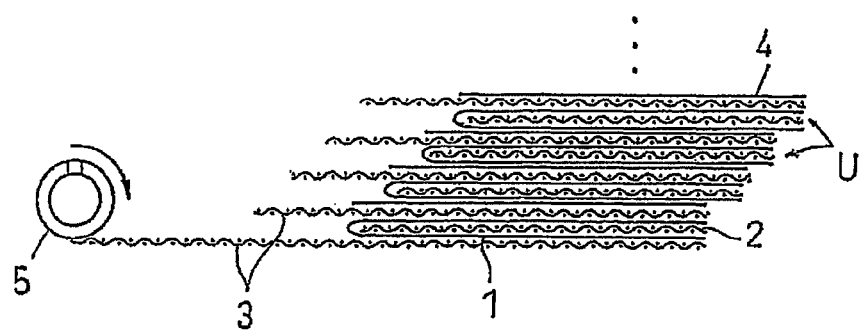

[FIG.2]
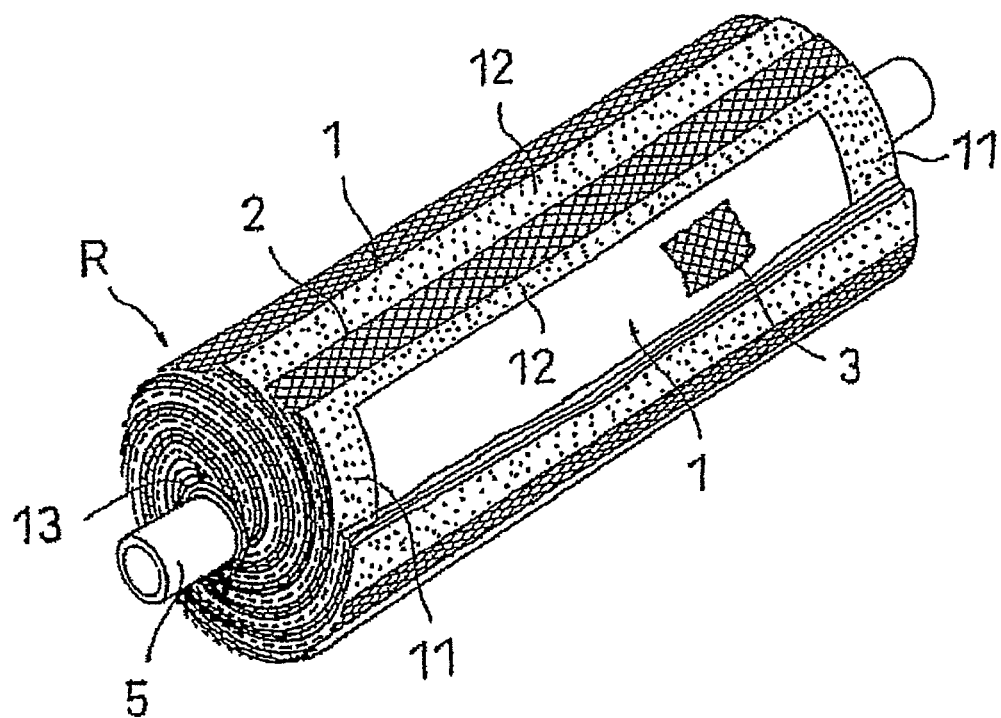
[FIG.3]
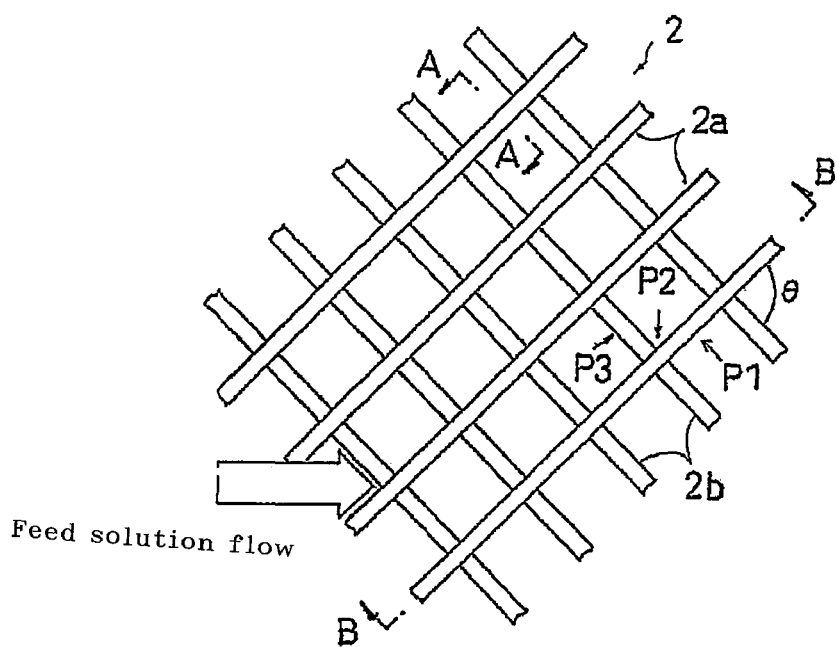
Feed solution flow

[FIG.4]
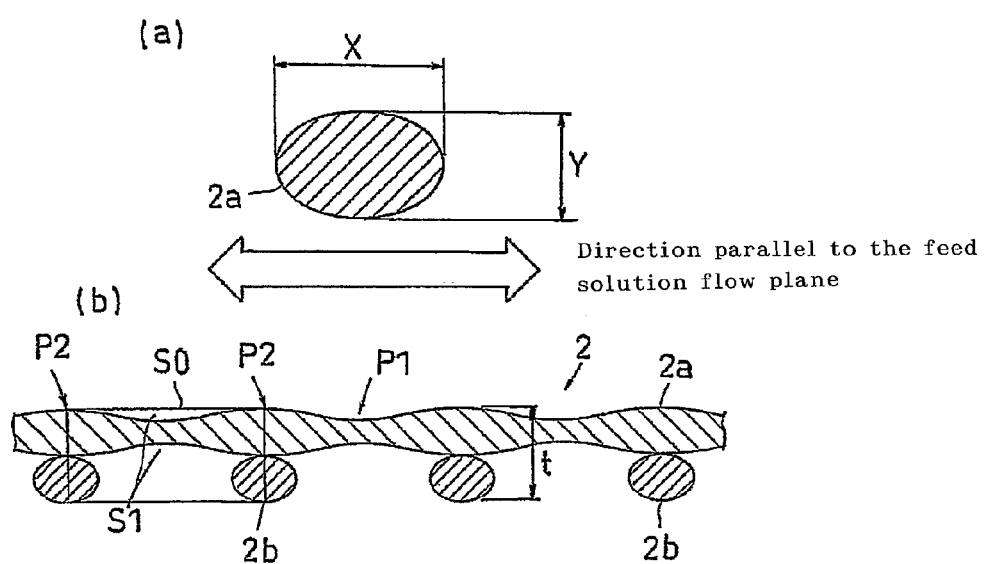

[FIG.5]
(a)
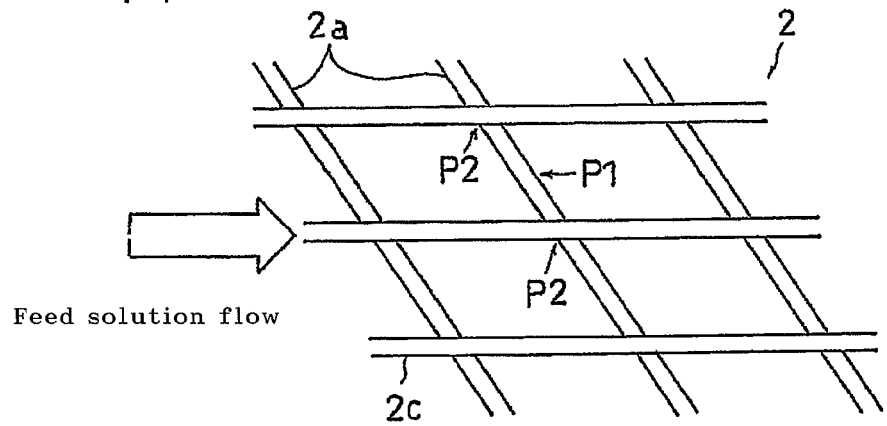
(b)
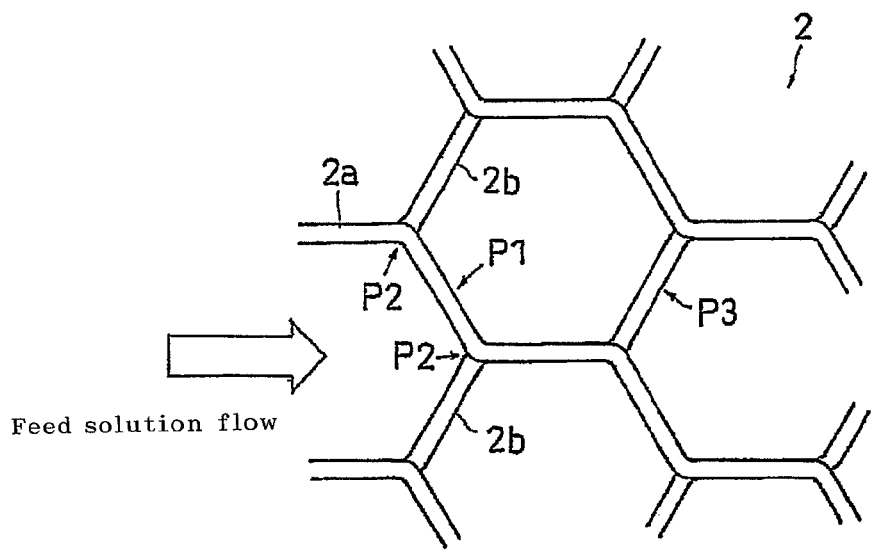

[FIG.6]
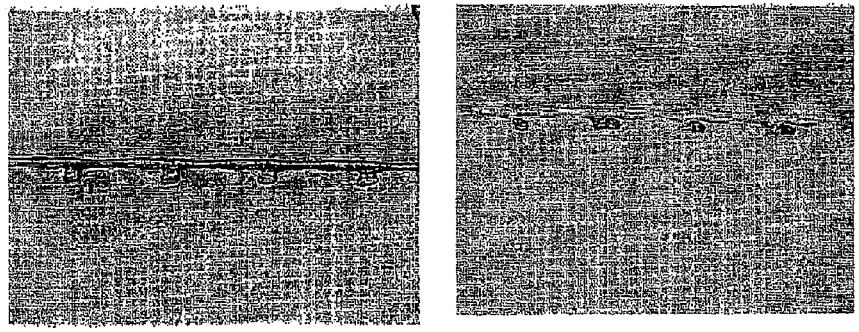
Flow passageway member of Example 1
[FIG.7]
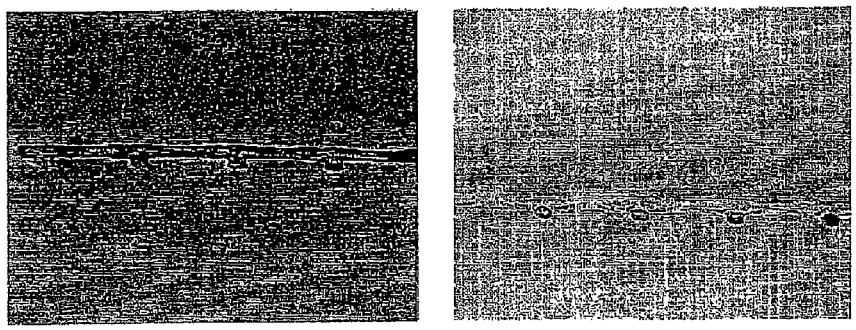
Flow passageway member of Example 2
[FIG.8]
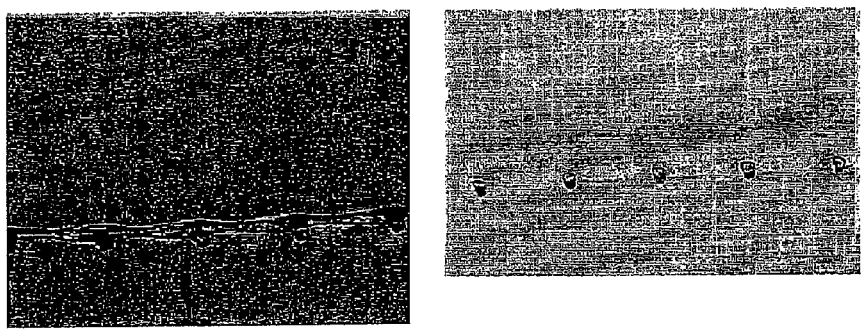
Flow passageway member of Comparative example 1

[FIG.9]
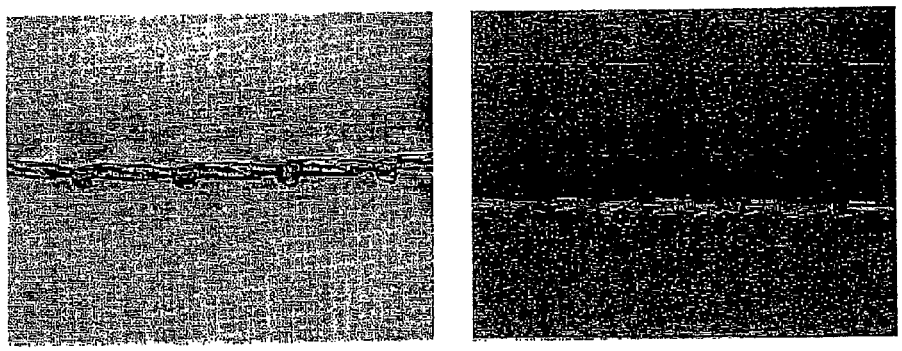
Flow passageway member of Comparative example 2
[FIG.10]
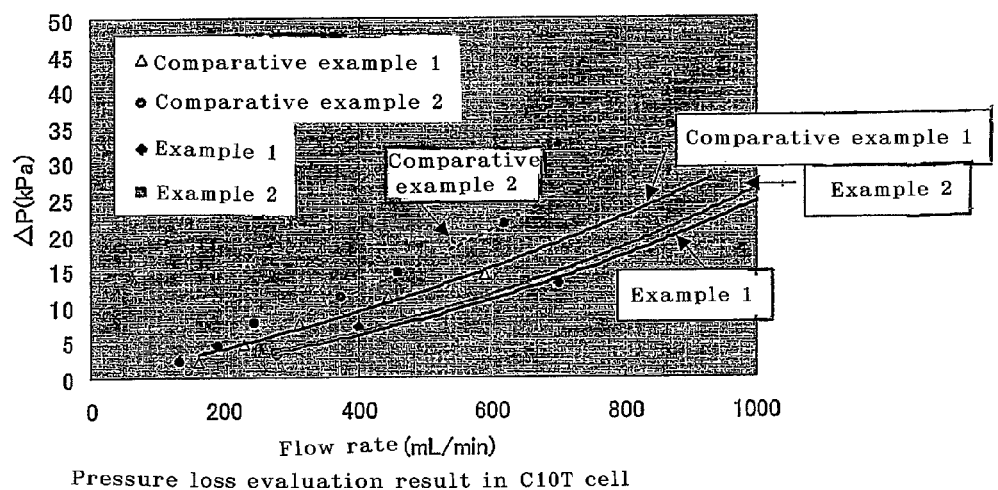
Pressure loss evaluation result in C10T cell

[FIG.11]
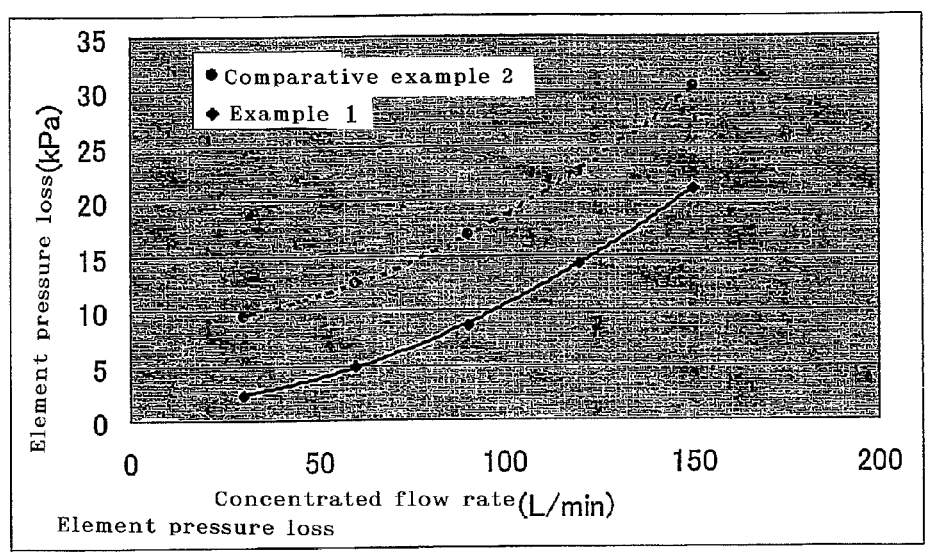
Element pressure loss

SPIRAL SEPARATION MEMBRANE ELEMENT

This application is the U.S. National Phase under 35 U.S.C. §371 of International Application No. PCT/JP2006/321371, filed Oct. 26, 2006, which claims priority to the Japanese Patent Application No. 2005-316688, filed Oct. 31, 2005. The International Application was not published in English under PCT Article 21(2).

FIELD OF THE ART

The present invention relates to a spiral-type separation membrane element that separates components existing in a liquid. More particularly, the present invention relates to a spiral-type separation membrane element that can reduce the pressure loss of the feed-side flow passageway to be smaller than in a conventional case, and that incorporates a feed-side flow passageway member having an agitation effect needed for restraining the concentration polarization on the membrane surface.

BACKGROUND ART

As a structure of a conventional spiral-type separation membrane element, those are known in which a single laminate or plural laminates of a separation membrane, a feed-side flow passageway member, and a permeate-side flow passageway member are wound around a porous hollow water-collecting tube (See, for example, the patent document 1).

In this membrane element, a feed solution is supplied from one end surface and is filtered by the separation membrane while flowing along the feed-side flow passageway member, and the concentrated liquid is taken out from the other end surface. The transmitted liquid that has been filtered by the separation membrane flows along the transmittance-side flow passageway member, flows in through the holes of the water-collecting tube, and flows within the water-collecting tube. For this reason, in order to enhance the energy efficiency of the separation operation, the smaller the pressure loss generated when the feed solution flows along the feed-side flow passageway member is, the more preferable it is.

As the feed-side flow passageway member, those having a net shape are typically used, and have a function of restraining the concentration polarization by promoting the surface renewal of the membrane surface while at the same time ensuring the flow passageway on the element feed-side. In order to restrain the concentration polarization, there is a method of increasing the linear speed of the membrane surface by reducing the thickness of the passageway member. However, this has a problem such that the floating components in the supplied liquid clog the flow passageway, or a problem such that the needed dynamic power of the pump that transports the supplied liquid will be large.

Thus, in order to restrain the concentration polarization caused by the feed-side flow passageway member and to reduce the pressure loss of the feed-side flow passageway, a feed-side flow passageway member is known in which the thread constituting the net is tilted relative to the flow direction of the feed solution and the interval between the intersections in the flow direction of the feed solution is made larger than the interval between the intersections in the direction perpendicular to this (See, for example, the patent document 2).

Also, a feed-side flow passageway member is known in which the diameter of the lateral thread that intersects relative to the flow direction of the feed solution is made smaller than the diameter of the longitudinal thread that is parallel to the flow direction (See, for example, the patent document 3).

However, in any of the above-described feed-side flow passageway members, the cross-sectional shape of the net-constituting thread is circular, and also the thickness is constant, so that there has been a limit in attaining compatibility between the restraint of the concentration polarization caused by the feed-side flow passageway member and the reduction of the pressure loss of the feed-side flow passageway.

PATENT DOCUMENT 1: Japanese Patent Application Laid-Open (JP-A) No. 10-137558
PATENT DOCUMENT 2: JP-A No. 2000-437
PATENT DOCUMENT 3: JP-A No. 2004-283708

DISCLOSURE OF THE INVENTION

Problems to be Solved by the Invention

Thus, an object of the present invention is to provide a spiral-type separation membrane element that can reduce the pressure loss of the feed-side flow passageway while maintaining the effect of restraining the concentration polarization, and also hardly raises a problem of the inhibition of the flow or clogging of the feed-side flow passageway.

Means for Solving the Problems

In order to achieve the aforementioned object, the present inventors have made eager researches on the shape and the structure of the feed-side flow passageway member, and have found out that the aforementioned object can be achieved by making the cross-sectional shape of the net-constituting thread be oblong and also changing the thickness, thereby completing the present invention.

Namely, the spiral-type separation membrane element of the present invention is a spiral-type separation membrane element in which a separation membrane, a feed-side flow passageway member, and a permeate-side flow passageway member are wound in a spiral form around a porous water-collecting tube in a laminated state, characterized in that said feed-side flow passageway member includes a net-constituting thread in a direction tilted relative to a feed solution flow direction; the net-constituting thread has a cross-sectional part such that a thread diameter X in a direction parallel to a feed solution flow plane is larger than a thread diameter Y in a direction perpendicular to the feed solution flow plane; and a central part between intersection parts of the net-constituting thread is made to have a thread diameter Y smaller than that of an intersection part. Here, the feed solution flow direction refers to the direction parallel to the axial center of the water-collecting tube.

According to the present invention, because the net-constituting thread has a cross-sectional shape such that the thread diameter X is larger than the thread diameter Y, and the central part between the intersection parts of the net-constituting thread is made to have a thread diameter Y smaller than that of the intersection part, the hollow gap ratio of the feed-side flow passageway will be raised, whereby the pressure loss of the feed-side flow passageway can be reduced, and also one can make the problem of the inhibition of the flow and the clogging of the feed-side flow passageway be hardly raised. At this time, since there is a constituent thread in a direction tilted to the flow direction, and the agitation of the flow is carried out by this thread, the effect of restraining the concentration polarization can be maintained.

In the above, it is preferable that said feed-side flow passageway member further includes a net-constituting thread tilted in a reverse direction relative to the feed solution flow direction while intersecting with said net-constituting thread; the net-constituting thread has a cross-sectional part such that a thread diameter X in a direction parallel to the feed solution flow plane is larger than a thread diameter Y in a direction perpendicular to the feed solution flow plane; and a central part between the intersection parts of the net-constituting thread is made to have a thread diameter Y smaller than that of an intersection part.

In this manner, by making both of the intersecting net-constituting threads so that the net-constituting thread has a cross-sectional part such that the thread diameter X is larger than the thread diameter Y, and the central part is made to have a thread diameter Y smaller than that of the intersection part, the hollow gap ratio of the feed-side flow passageway will be further raised, whereby the pressure loss of the feed-side flow passageway can be reduced further, and also one can make the problem of the inhibition of the flow and the clogging of the feed-side flow passageway be more hardly raised.

Also, it is preferable that said net-constituting thread has a ratio (X/Y) of the thread diameter X to the thread diameter Y within a range from 1.1 to 1.5, and an area ratio of a space in a longitudinal cross section between the intersection parts of said net-constituting thread is from 35 to 50%. With this construction, the hollow gap ratio of the feed-side flow passageway will be raised with more certainty, whereby the pressure loss of the feed-side flow passageway can be reduced further, and also one can make the problem of the inhibition of the flow and the clogging of the feed-side flow passageway be more hardly raised.

BRIEF DESCRIPTION OF THE DRAWINGS

FIG. 1 is a step view showing one example of a method for producing a spiral-type separation membrane element of the present invention. FIG. 1(a) is an assembled perspective view of a separation membrane unit, and FIG. 1(b) is a front view showing a state before the separation membrane unit is laminated and wound.

FIG. 2 is a partially fractured perspective view showing one example of a spiral-type separation membrane element of the present invention.

FIG. 3 is an essential part view showing one example of an essential part of a spiral-type separation membrane element of the present invention.

FIG. 4 is a cross-sectional view showing an essential part of a spiral-type separation membrane element of the present invention. FIG. 4(a) is a cross-sectional arrow view thereof along A-A, and FIG. 4(b) is a cross-sectional arrow view thereof along B-B.

FIG. 5 is a cross-sectional view showing another example of an essential part of a spiral-type separation membrane element of the present invention. FIG. 5(a) is an embodiment in which both net-constituting threads have a straight line shape, where one net-constituting thread is disposed in a direction tilted relative to the feed solution flow direction, and the other net-constituting thread is disposed in parallel to the feed solution flow direction. FIG. 5(b) is an embodiment in which both net-constituting threads have a bent and curved shape, and both have a part in a direction tilted relative to the feed solution flow direction.

FIG. 6 is a cross-sectional photograph of a flow passageway member (left side) and a cross-sectional photograph of a thread (right side) in the Example 1.

FIG. 7 is a cross-sectional photograph of a flow passageway member (left side) and a cross-sectional photograph of a thread (right side) in the Example 2.

FIG. 8 is a cross-sectional photograph of a flow passageway member (left side) and a cross-sectional photograph of a thread (right side) in the Comparative Example 1.

FIG. 9 is a cross-sectional photograph of a flow passageway member (left side) and a cross-sectional photograph of a thread (right side) in the Comparative Example 2.

FIG. 10 is a graph showing an evaluation result of the pressure loss of a flow passageway member in the Examples and others.

FIG. 11 is a graph showing an evaluation result of the pressure loss of an element in the Examples and others.

DESCRIPTION OF THE SYMBOLS 1 separation membrane
2 feed-side flow passageway member
2a net-constituting thread (tilted thread)
2b net-constituting thread (tilted thread)
2c net-constituting thread (parallel thread)
3 transmittance-side flow passageway member
5 water-collecting tube
X thread diameter in the direction parallel to the feed solution flow plane
Y thread diameter in the direction perpendicular to the feed solution flow plane
P1 central part of the net-constituting thread
P2 intersection part of the net-constituting thread
P3 central part of the net-constituting thread
S0 area between the intersection parts of the net-constituting thread
S1 area of space

BEST MODES FOR IMPLEMENTING THE INVENTION

Hereafter, embodiments of the present invention will be described with reference to the drawings. FIG. 1 is a step view showing one example of a method for producing a spiral-type separation membrane element of the present invention. FIG. 2 is a partially fractured perspective view showing one example of a spiral-type separation membrane element of the present invention. FIG. 3 is a plan view showing one example of a feed-side flow passageway member of a spiral-type separation membrane element of the present invention. FIG. 4(a) is a cross-sectional arrow view thereof along A-A, and FIG. 4(b) is a cross-sectional arrow view thereof along B-B.

In the spiral-type separation membrane element of the present invention, only the shape of the feed-side flow passageway member is different from that of a conventional one. Therefore, regarding the other structures, materials, and so on, any of the constructions of a conventional spiral-type separation membrane element can be applied.

As shown in FIGS. 1 to 2, in the spiral-type separation membrane element of the present invention, a separation membrane 1, a feed-side flow passageway member 2, and a transmittance-side flow passageway member 3 are wound in a spiral form around a porous water-collecting tube 5 in a laminated state. Typically, with regard to this tubular wound body R, a sealing part is provided for preventing the mixing of a feed-side fluid and a transmittance-side fluid. The sealing part includes two-end sealing parts 11 and an outer perimeter-side sealing part 12.

As shown in FIG. 2, the two ends of the separation membrane 1 that oppose via the transmittance-side flow passageway member 3 are sealed with the two-end sealing parts 11, and the feed-side flow passageway member 2 intervenes between a plurality of the two-end sealing parts 11 disposed in a spiral form. Also, the outer perimeter-side end part of the separation membrane 1 that opposes via the transmittance-side flow passageway member 3 is sealed with the outer perimeter-side sealing part 12 located along the axial direction.

The tubular wound body R can be produced through a step of winding a separation membrane 1, a feed-side flow passageway member 2, and a transmittance-side flow passageway member 3 in a spiral form around a porous water-collecting tube 5 in a laminated state to form a tubular wound body R and a step of forming sealing parts 11, 12 to prevent mixing of the feed-side fluid and the transmittance-side fluid.

Specifically, for example, it can be produced by an embodiment shown in FIG. 1. FIG. 1(a) is an assembled perspective view of a separation membrane unit, and FIG. 1(b) is a front view showing a state before the separation membrane unit is laminated and wound.

First, as shown in FIG. 1(a), a unit is prepared by placing a feed-side flow passageway member 2 between a double-folded separation membrane 1, laminating a transmittance-side flow passageway member 3 thereon, and applying an adhesive 4, 6 for forming sealing parts to prevent mixing of the feed-side fluid and the transmittance-side fluid on the two end parts in the axial direction and on the winding end part of the transmittance-side flow passageway member 3. At this time, a protective tape may be bonded on the folded part of the separation membrane 1.

As the separation membrane 1, one can use a reverse-osmosis membrane, an ultrafiltration membrane, a precision filtration membrane, a gas separation membrane, a degassing membrane, or the like. As the transmittance-side flow passageway member 3, one can use a net-shaped material, a mesh-shaped material, a sheet having grooves, a sheet having a wave form, or the like. As to the feed-side flow passageway member 2, description will be given later.

The porous water-collecting tube 5 has open holes around the tube. The material of the water-collecting tube 5 may be any of resin, metal, and the like; however, a plastic such as Noryl resin or ABS resin is typically used.

As the adhesive 4, 6, any of the conventionally known adhesives can be used such as an urethane-based adhesive, an epoxy-based adhesive, and a hot-melt adhesive.

Next, as shown in FIG. 1(b), a plurality of these separation membrane units U are laminated and wound in a spiral form around a porous water-collecting tube 5, followed by curing or the like of the adhesive and the like with heat to obtain a tubular wound body R. At that time, sealing around the water-collecting tube 5 may be carried out at the same time. The two ends of the tubular wound body R are subjected to trimming or the like in accordance with the needs so as to adjust the length in the axial direction.

The number of separation membrane units U to be laminated is determined by the needed transmittance flow rate, and may be one layer or more; however, about 100 layers is the upper limit in consideration of the operability. Here, the larger the number of laminated separation membrane units U is, the smaller the number of winding each separation membrane unit U will be.

As shown in FIGS. 3 to 4, the present invention is characterized in that, in a spiral-type separation membrane element such as described above, said feed-side flow passageway member 2 includes a net-constituting thread 2a in a direction tilted relative to a feed solution flow direction; the net-constituting thread 2a has a cross-sectional part such that a thread diameter X in a direction parallel to a feed solution flow plane is larger than a thread diameter Y in a direction perpendicular to the feed solution flow plane; and a central part P1 between intersection parts of the net-constituting thread 2a is made to have a thread diameter Y smaller than that of an intersection part P2.

In the present embodiment, an example is shown in which the feed-side flow passageway member 2 further includes a net-constituting thread 2b tilted in a reverse direction relative to the feed solution flow direction while intersecting with said net-constituting thread 2a; the net-constituting thread 2b has a cross-sectional part such that a thread diameter X in a direction parallel to the feed solution flow plane is larger than a thread diameter Y in a direction perpendicular to the feed solution flow plane; and a central part P3 between intersection parts of the net-constituting thread 2b is made to have a thread diameter Y smaller than that of an intersection part P2.

In the present invention, it is preferable that at least one of said net-constituting threads 2a, 2b has a ratio (X/Y) of the thread diameter X to the thread diameter Y within a range from 1.1 to 1.5, more preferably from 1.1 to 1.3. In the present embodiment, it is preferable that both of the net-constituting threads 2a, 2b satisfy the above numerical value range. When the ratio (X/Y) is smaller than this range, a vortex is violently generated in a rear flow in the rear of the thread that is generated relative to the feed solution flow, and the flow passageway resistance tends to be large. On the other hand, when the ratio (X/Y) is larger than this range, the amount of the resin to be used will be large, and the cost of the flow passageway member tends to increase.

Here, for X/Y, an arbitrary part is measured; however, it is preferably an average value obtained by measuring at least 10 points. As the measurement method, a method of measuring with a magnifying apparatus such as an optical microscope or a CCD camera is preferable.

Also, in allowing the central part P1 between the intersection parts of the net-constituting thread 2a to have a thread diameter Y smaller than that of the intersection part P2, the ratio (P1/P2) of the thread diameter Y at the central part P1 to the thread diameter Y at the intersection part P2 is preferably from 0.2 to 0.8, more preferably from 0.3 to 0.7. When this ratio (P1/P2) is smaller than 0.2, the production or the handling tends to be difficult. Conversely, when it is larger than 0.8, the effect obtained by changing the thread diameter of the net-constituting threads 2a, 2b tends to be smaller. Here, the above-described relationship applies in a similar manner to the net-constituting thread 2b as well.

Also, with respect to at least one of the net-constituting threads 2a, 2b, an area ratio of a space in a longitudinal cross section between the intersection parts P2 of the net-constituting thread is preferably from 35 to 50%, more preferably from 37 to 45%. Here, the area ratio of a space refers to a value obtained by dividing the area Si of the space with the area SO between the intersection points P2 in a longitudinal cross section and multiplying it with 100. When the area ratio of the space is lower than this range, the flow passageway resistance will be large, and the pressure loss tends to increase. When the area ratio of the space is made higher than 50%, the thread diameter thickness may be too small, or the pitch between the threads may be too wide, whereby the net-constituting thread tends to have no nerve as a net, making the handling thereof difficult. It is desirable that the area ratio of the space is an average value obtained by determining the area ratios of the spaces of at least ten intervals.

The feed-side flow passageway member 2 having such a cross-sectional shape and a thread diameter change of the net-constituting threads 2a, 2b can be produced as follows by the fusion method or the shearing method.

For example, in molding a net by the fusion method, the lateral thread and the longitudinal thread are extruded and fused with each other at the intersection parts while rotating numerous nozzle holes disposed on inner and outer two circumferences of a die of an extruder in reverse directions, and the resultant is collected after immersion in a cooling tank. In doing the above-described extrusion, the nozzle holes are disposed so that the nozzle holes of the two will not overlap with each other at the intersection parts of the lateral thread and the longitudinal thread (on this point, the method differs from the shearing method), and the extruded lateral thread and longitudinal thread are fused at a timing at which suitable fusion occurs.

At that time, in the present invention, the ratio (X/Y) of the net-constituting threads $2a$, $2b$ can be controlled to be 1.1 or above by allowing the nozzle holes of the die to have an elliptic shape. Also, by adding a suitable tension in extruding the lateral thread and the longitudinal thread, the central part P1 between the intersection parts can be made to have a thread diameter Y smaller than that of the intersection part P2, whereby the area ratio of the space can be made to be from 35 to 50%.

As a material of the net used in the feed-side flow passageway member 2, any of those similar to a conventional net can be used; however, polyethylene resin, polypropylene resin, or the like is preferable. The net-constituting threads $2a$, $2b$ constituting the feed-side flow passageway member 2 are preferably bonded and fixed to each other at the intersection parts P2 by fusion, welding, or the like.

Also, when the net is allowed to have a small thickness, the linear speed of the membrane surface will be larger, and can restrain the concentration polarization. However, when the thickness is made too small, there will be raised a problem such that the floating components in the supplied liquid clog the flow passageway or a problem such that the needed dynamic power of the pump that feeds the supplied liquid will be large. Therefore, the thickness t of the intersection part P2 is preferably at least 0.5 mm and at most 2.0 mm. The thickness t of the intersection part P2 of the net as referred to herein is preferably an average thickness obtained by measuring at least 10 points. As the measurement method, there are a method of measurement with a thickness gauge, a method of measurement with a magnifying apparatus such as an optical microscope or a CCD camera, and the like method.

The thread interval of the net-constituting threads $2a$, $2b$ is preferably set to be an optimum pitch. For example, the thread interval is preferably from 3 to 8 mm. When the thread interval is smaller than this, the pressure loss of the flow passageway tends to increase though there is an effect of restraining the concentration polarization. Conversely, when the thread interval is larger than this, the concentration polarization tends to be generated, thereby inviting decrease in the element performance, though the pressure loss will be small.

The intersection angle θ formed by crossing of the net-constituting threads $2a$, $2b$ is preferably from 50 to 120 degrees. Namely, each of the net-constituting threads $2a$, $2b$ is preferably tilted by 25 to 60 degrees relative to the feed solution flow direction. Generally, when the angle is small relative to the feed solution flow, the pressure loss of the feed-side flow passageway can be reduced. On this point, detailed description is given in Japanese Patent No. 3230490.

The spiral-type separation membrane element of the present invention typically has a structure such that the element is bound by an exterior packaging material and will not have an enlarged diameter. For the exterior packaging material, a single sheet or plural sheets can be wound around on the surface of a tubular wound body. As the exterior packaging material, polyester, polypropylene, polyethylene, polyvinyl chloride, glass fiber cloth, or the like can be used.

In the spiral-type separation membrane element of the present invention, further, a porous end material, a sealing material, a reinforcing material, or the like can be disposed in accordance with the needs for preventing deformation (telescope or the like).

[Other Embodiments]

(1) In the above-described embodiment, an example has been shown in which two kinds of net-constituting threads having a straight line shape are disposed each in a direction tilted relative to the feed solution flow direction; however, it is sufficient that the feed-side flow passageway member in the present invention includes a net-constituting thread in a direction tilted relative to the feed solution flow direction, so that it may have a shape such as shown in FIG. 5($a$) to FIG. 5($b$), for example.

The one shown in FIG. 5($a$) is an example in which, though both of the net-constituting threads $2a$, $2c$ have a straight line shape, one net-constituting thread $2a$ is disposed in a direction tilted relative to the feed solution flow direction, and the other net-constituting thread $2c$ is disposed in parallel to the feed solution flow direction. In this case also, one net-constituting thread $2a$ has a cross-sectional part such that a thread diameter X in a direction parallel to the feed solution flow plane is larger than a thread diameter Y in a direction perpendicular to the feed solution flow plane, and a central part P1 between the intersection parts of the net-constituting thread $2a$ is made to have a thread diameter Y smaller than that of an intersection part P2, so that the function and the effect of the present invention can be produced.

The one shown in FIG. 5($b$) is an example in which both of the net-constituting threads $2a$, $2b$ have a bent and curved shape, and both have a part in a direction tilted relative to the feed solution flow direction. In this case also, at least one of the net-constituting thread $2a$ and the net-constituting thread $2b$ has a cross-sectional part such that a thread diameter X in a direction parallel to the feed solution flow plane is larger than a thread diameter Y in a direction perpendicular to the feed solution flow plane, and a central part P1 between the intersection parts of the net-constituting thread is made to have a thread diameter Y smaller than that of an intersection part P2, so that the function and the effect of the present invention can be produced.

(2) In the above-described embodiment, an example has been shown in which the cross-sectional shape of each of the net-constituting threads is an elliptic shape; however, the cross-sectional shape of the net-constituting thread may be any as long as it is a shape such that the thread diameter X is larger than the thread diameter Y, so that it may be a rectangular shape, a trapezoidal shape, a rhombic shape, or the like, for example.

(3) In the above-described embodiment, description has been given on an example in which a transmittance-side flow passageway member 3 is superposed on a separation membrane 1 that has been double-folded to sandwich a feed-side flow passageway member 2, and an adhesive 4, 6 is applied, as shown in FIG. 1. However, in the present invention, one can superpose a double-folded separation membrane 1 on a transmittance-side flow passageway member 3 and apply an adhesive 4, 6 thereon.

(4) In the above-described embodiment, an example has been shown in which a spiral membrane element equipped with plural membrane leaves is produced by using plural separation membrane units U as shown in FIG. 1; however, in the present invention, one can produce a spiral membrane element equipped with one sheet of a membrane leaf by using one set of a separation membrane unit U.

EXAMPLES

Hereafter, Examples and others specifically showing the construction and the effect of the present invention will be described. Here, the evaluation items in the Examples and others were measured as follows.

Examples 1 to 2

Nets shown in the following Table 1 and FIGS. 6 to 7 produced by the fusion method were set in a parallel flat plate cell (C10-T; flow passageway width: 35 mm, flow passageway length: 135 mm), and measurements were made on the flow rate and the pressure loss when pure water was passed. The result thereof is shown in Fig. 10.

Comparative Examples 1 to 2

Nets shown in the following Table 1 and FIGS. 8 to 9 produced by the fusion method were set in a parallel flat plate cell (C10-T; flow passageway width: 35 mm, flow passageway length: 135 mm), and measurements were made on the flow rate and the pressure loss when pure water was passed. At that time, as shown in Table 1, one having a ratio (X/Y) smaller than 1 was used as the Comparative Example 1, and one having a small area ratio of space was used as the Comparative Example 2 because the thickness of the net-constituting thread was almost constant. The result thereof is shown in FIG. 10.

TABLE 1

| Item | Example 1 | Example 2 | Comparative Example 1 | Comparative Example 2 |
| --- | --- | --- | --- | --- |
| Material | PP resin | PP resin | PP resin | PP resin |
| Average thickness (mm) | 0.79 | 0.79 | 0.79 | 0.79 |
| Thread interval (mm) | 3.0 | 3.0 | 3.0 | 3.0 |
| Intersection angle (degrees) | 90 | 90 | 90 | 90 |
| X/Y (—) | 1.14 | 1.21 | 0.9 | 1.12 |
| Area of space (%) | 42.0 | 38.0 | 39.5 | 23.8 |

Here, FIGS. 6 to 9 show cross-sectional photographs of the flow passageway members (left side) and cross-sectional photographs of the threads (right side) of Example 1, Example 2, Comparative Example 1, and Comparative Example 2.

As shown by the results of FIG. 10, regarding the nets of Examples 1 to 2, though the thickness, the thread interval, and the intersection angle were the same, X/Y was 1.1 or above, and the hollow gap ratio of the intersection part was 35% or above, so that the pressure loss of the flow passageway member decreased by at least 20%.

Test Example 1

With use of the nets shown in Example 1 and Comparative Example 2, a spiral element having a membrane area of 33.9 m² was fabricated, and measurements were made on the flow rate and the pressure loss when pure water was passed in a state in which the element is mounted in a pressure container. The result is shown in FIG. 11. The decrease in the pressure loss confirmed in C10-T could be confirmed also in actual elements.

Test Example 2

Also, with regard to the above spiral elements prepared with use of the nets of Example 1 and Comparative Example 2, performance was evaluated with a 1500 ppm aqueous solution of NaCl under the condition of 1.55 MPa and a collection ratio of 15%. As a result of this, as shown in Table 2, Example 1 was not inferior in the blocking ratio as compared with Comparative Example 2, so that it has been confirmed that a turbulent flow effect sufficient to maintain the concentration polarization can be obtained.

TABLE 2

| | Element performance | |
| --- | --- | --- |
| | Example 1 | Comparative Example 2 |
| NaCl blocking ratio(%) | 99.80 | 99.81 |
| Transmitted water amount(m³ × d) | 50.2 | 49.9 |

Evaluation condition
(1) Operation pressure: 1.55 MPa
(2) Feed solution: 1500 ppm NaCl solution
(3) Collection ratio: 15%

The invention claimed is:

1. A spiral-type separation membrane element in which a separation membrane, a feed-side flow passageway member, and a permeate-side flow passageway member are wound in a spiral form around a porous water-collecting tube in a laminated state, characterized in that
said feed-side flow passageway member includes a first net-constituting thread in a direction tilted relative to a feed solution flow direction,
the first net-constituting thread has a cross-sectional part such that a thread diameter in a direction parallel to a feed solution flow plane (X) is larger than a thread diameter in a direction perpendicular to the feed solution flow plane (Y), wherein the first net-constituting thread has a ratio (X/Y) within a range from 1.1 to 1.5, and
a central part between intersection parts of the first net-constituting thread is made to have a thread diameter in a direction perpendicular to the feed solution flow plane ($Y_{P1}$) smaller than a thread diameter in a direction perpendicular to the feed solution flow plane ($Y_{P2}$) of an intersection part.

2. The spiral-type separation membrane element according to claim 1, wherein said feed-side flow passageway member further includes a second net-constituting thread tilted in a reverse direction relative to the feed solution flow direction while intersecting with said first net-constituting thread,
the second net-constituting thread has a cross-sectional part such that a thread diameter in a direction parallel to the feed solution flow plane (X) is larger than a thread diameter in a direction perpendicular to the feed solution flow plane (Y), and
a central part between intersection parts of the second net-constituting thread is made to have a thread diameter in a direction perpendicular to the feed solution flow plane ($Y_{P1}$) smaller than a thread diameter in a direction perpendicular to the feed solution flow plane ($Y_{P2}$) of an intersection part.

3. The spiral-type separation membrane element according to claim 1, wherein the ratio ($Y_{P1}/Y_{P2}$) of thread diameter Y at the central part (P1) of the first net-constituting thread located between intersection parts, relative to thread diameter Y at intersection part (P2) of the first net-constituting thread is from 0.2 to 0.8.

4. The spiral-type separation membrane element according to claim 2, wherein the ratio ($Y_{P1}/Y_{P2}$) of thread diameter Y at the central part (P1) of the second net-constituting thread located between intersection parts, relative to thread diameter Y at intersection part (P2) of the second net-constituting thread is from 0.2 to 0.8.

5. The spiral-type separation membrane element according to claim 2, wherein the thickness of the intersection part of said first and said second net-constituting threads is from 0.5 mm to 2.0 mm.

6. The spiral-type separation membrane element according to claim 1, wherein said first net-constituting thread has an elliptic cross-sectional shape.

7. The spiral-type separation membrane element according to claim 2, wherein at least one of said first and/or second net-constituting threads has an elliptic cross-sectional shape.

8. The spiral-type separation membrane element according to claim 1, wherein the first net-constituting thread has a ratio (X/Y) within a range from 1.1 to 1.3.

* * * * *

UNITED STATES PATENT AND TRADEMARK OFFICE
CERTIFICATE OF CORRECTION

PATENT NO. : 8,303,815 B2
APPLICATION NO. : 11/722659
DATED : November 6, 2012
INVENTOR(S) : Masashi Beppu et al.

It is certified that error appears in the above-identified patent and that said Letters Patent is hereby corrected as shown below:

In the Specifications:

At Column 6, Line 50, change "Si" to --S1--.

Signed and Sealed this
Eighteenth Day of June, 2013

Teresa Stanek Rea
*Acting Director of the United States Patent and Trademark Office*